United States Patent
Schiele et al.

(10) Patent No.: US 7,537,545 B2
(45) Date of Patent: May 26, 2009

(54) METHOD FOR CONTROLLING AN AUTOMATIC TRANSMISSION AND AUTOMATIC TRANSMISSION

(75) Inventors: Peter Schiele, Kressbronn (DE); Christian Popp, Kressbronn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 390 days.

(21) Appl. No.: 11/418,443

(22) Filed: May 4, 2006

(65) Prior Publication Data
US 2006/0259223 A1    Nov. 16, 2006

(30) Foreign Application Priority Data
May 12, 2005    (DE)    .................. 10 2005 021 924

(51) Int. Cl.
*F16H 61/20* (2006.01)
*B60W 10/04* (2006.01)
*B60W 10/02* (2006.01)

(52) U.S. Cl. ................ 477/114; 477/93; 477/175
(58) Field of Classification Search .......... 477/114, 477/115, 93, 175, 180; 701/68; 192/3.63
See application file for complete search history.

(56) References Cited

U.S. PATENT DOCUMENTS

| | | | |
|---|---|---|---|
| 4,644,826 A * | 2/1987 | Kubo et al. | 477/95 |
| 4,775,938 A | 10/1988 | Hiramatsu | |
| 5,119,694 A * | 6/1992 | Sato et al. | 477/93 |
| 5,272,630 A | 12/1993 | Brown et al. | |
| 5,549,525 A | 8/1996 | Wendel | |
| 6,023,648 A | 2/2000 | Murasugi et al. | |
| 6,248,042 B1 | 6/2001 | Lee | |
| 6,270,443 B1 * | 8/2001 | Ito et al. | 477/114 |

FOREIGN PATENT DOCUMENTS

| | | |
|---|---|---|
| DE | 42 23 084 A1 | 11/1992 |
| DE | 44 46 077 A1 | 6/1996 |
| DE | 197 28 429 A1 | 1/1998 |
| DE | 199 62 794 A1 | 1/2001 |
| WO | WO-97/44600 | 11/1997 |

* cited by examiner

*Primary Examiner*—Roger Pang
(74) *Attorney, Agent, or Firm*—Davis & Bujold, P.L.L.C.

(57) ABSTRACT

A method for controlling an automatic transmission of a motor vehicle, namely for controlling a static disengagement function, such that if the motor vehicle's speed is lower than a limiting speed value and if, at the same time, at least one further initiation criterion is fulfilled, static disengagement is implemented. As a further initiation criterion, it is checked whether a characteristic parameter of a hydrodynamical starting element, in particular a torque converter, is below a limiting value of the characteristic parameter.

19 Claims, 1 Drawing Sheet

METHOD FOR CONTROLLING AN AUTOMATIC TRANSMISSION AND AUTOMATIC TRANSMISSION

This application claims priority from German Application Serial No. 10 2005 021 924.1 filed May 12, 2005.

FIELD OF THE INVENTION

The invention concerns a method for controlling an automatic transmission.

BACKGROUND OF THE INVENTION

The invention concerns an automatic transmission for a motor vehicle. The automatic transmission comprises a hydrodynamical starting element, in particular a torque converter, such that the automatic transmission is connected to the engine of the motor vehicle by way of the hydrodynamical starting element. The hydrodynamical starting element comprises a pump on the engine side and a turbine on the transmission side. The pump of the hydrodynamical starting element is coupled to the engine of the motor vehicle and the turbine of the hydrodynamical starting element is coupled to a transmission input shaft.

From the prior art, such automatic transmissions with a so-termed static disengagement function are already known. The static disengagement function reduces the consumption of the motor vehicle at rest when the drive position of the automatic transmission is engaged. This can happen either if the static disengagement function shifts the automatic transmission from the engaged drive position to a neutral or a parking position or, alternatively, if at least one clutch involved in the force flow is brought to slipping operation when the drive position is engaged.

Automatic transmissions with a static disengagement function are known in particular from DE 42 23 084 A1, DE 44 46 077 C2 and U.S. Pat. No. 5,272,630. According to DE 42 23 084 A1, when the drive position is engaged, the static disengagement function implements static disengagement when, on the one hand, the vehicle's speed is lower than a limiting speed value and when, in addition, a throttle value of an engine throttle valve is, at the same time, smaller than a limiting throttle valve value. If both these criteria are fulfilled simultaneously then, according to DE 42 23 084 A1, static disengagement is implemented. According to DE 44 46 077 C2, static disengagement is implemented when the drive position of the automatic transmission is engaged; in the event that, on the one hand, the vehicle's speed is lower than a limiting speed value and, on the other hand, at the same time a measured brake pressure of a brake system of the motor vehicle is higher than a limiting brake pressure value. In contrast, according to U.S. Pat. No. 5,272,630, static disengagement is implemented when, on the one hand, the vehicle's speed is lower than a limiting speed value and, on the other hand, the engine speed is lower than a limiting engine speed value. If static disengagement is implemented as a function of engine speed, this has the disadvantage that a specific engine speed limiting value has to be established for each automatic transmission depending on the hydrodynamic characteristic of the hydrodynamical starting element and the idling speed. This translates into high application effort and expense.

Starting from the above, the present invention addresses the problem of providing a new type of method for controlling an automatic transmission and a new type of automatic transmission.

This problem is solved by a method for controlling an automatic transmission. According to the invention, as a further initiation criterion, it is tested whether a characteristic parameter of a turbine of a hydrodynamical starting element, in particular a torque converter, is below a limiting value for the characteristic parameter.

In the context of the present invention it is proposed to actuate a standard coupling when, on the one hand, the speed of the motor vehicle is lower than a limiting speed value and when, on the other hand, a characteristic parameter of a turbine of the hydrodynamical starting element is below a limiting value for the characteristic parameter.

SUMMARY OF THE INVENTION

In the context of the present invention, static disengagement is implemented as a function of a characteristic turbine parameter of the hydrodynamical starting element. This considerably reduces the application effort compared with static disengagement functions which implement static disengagement as a function of the engine speed. A further advantage of the invention is that already, while the motor vehicle is coasting or immediately after coming to rest, static disengagement in the transmission takes place by shifting to the neutral position or to the parking position, or by bringing at least one clutch involved in the force flow into slipping operation so that thereby the time fraction of a motor vehicle stop during which static disengagement is implemented increases and the motor vehicle's fuel consumption can again be reduced while at rest.

In a first advantageous development of the invention, as an additional initiation criterion, it is checked whether a turbine torque of the hydrodynamical starting element is below a limiting turbine torque value. In this case, if the drive position is engaged, static disengagement is implemented when the motor vehicle's speed is lower than the limiting speed value and when, in addition, the turbine torque of the hydrodynamical starting element is lower than the limiting turbine torque value.

According to a second advantageous development of the invention, as an additional initiation criterion, it is checked whether a turbine speed of the hydrodynamical starting element is below a limiting turbine speed value. In this case, static disengagement is implemented when the motor vehicle's speed is below the limiting speed value if the drive position is engaged when, in addition, the turbine speed of the hydrodynamical starting element is lower than the limiting turbine speed value and, when in addition, the engine speed is below a limiting engine speed value. Alternatively in this case, static disengagement is implemented when the drive position is engaged, when the motor vehicle's speed is below the limiting speed value and, in addition, the turbine speed of the hydrodynamical starting element is below the limiting turbine speed value, but when the engine speed is higher than a limiting engine speed value, the static disengagement function is deactivated.

BRIEF DESCRIPTION OF THE DRAWINGS

The invention will now be described, by way of example, with reference to the accompanying drawings in which.

DETAILED DESCRIPTION OF THE INVENTION

Figure 1:
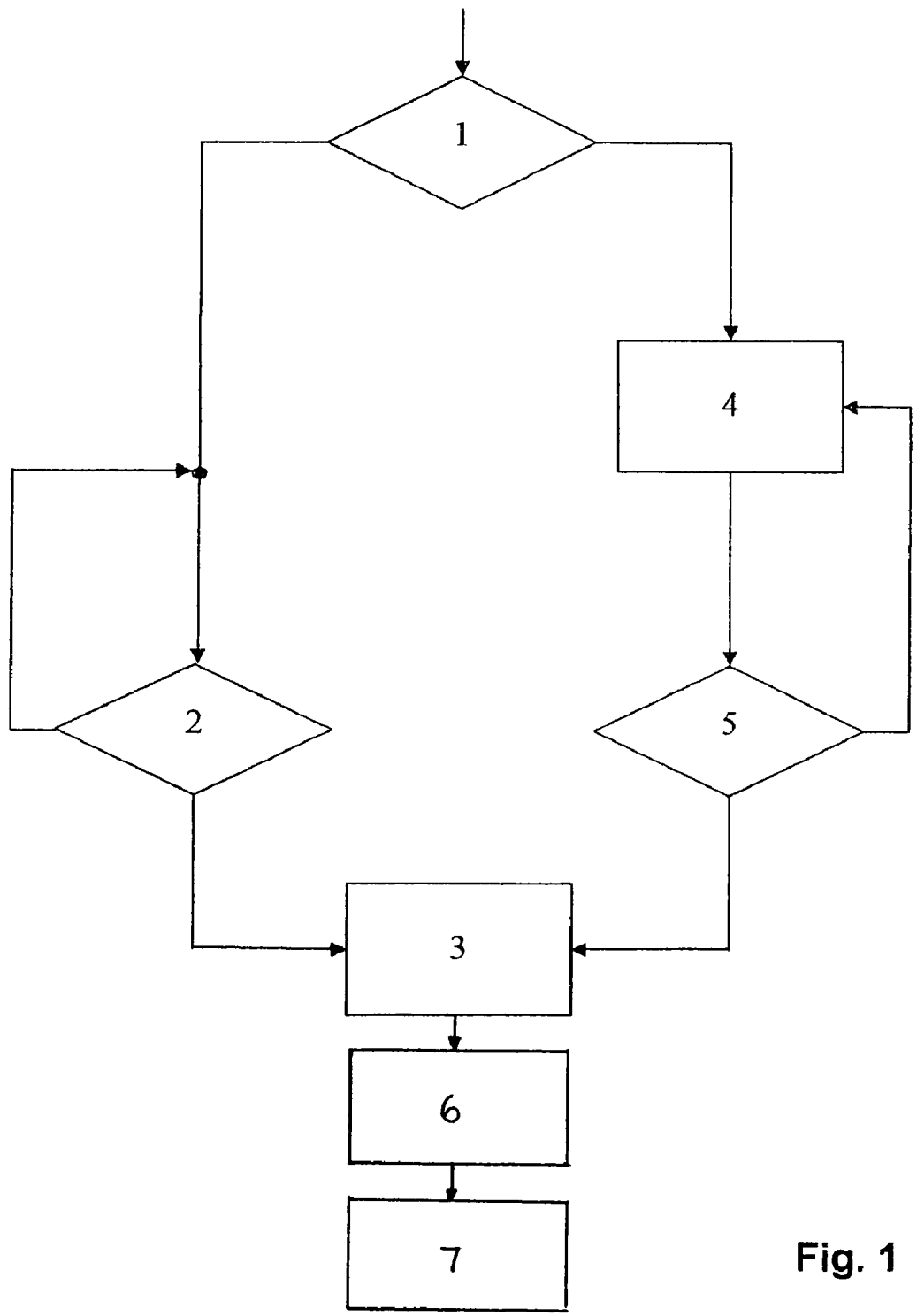
FIG. 1 is a signal flow chart to explain the method according to the invention for controlling an automatic transmission

FIG. 1 shows a schematic signal flowchart of the method, according to the invention, for controlling a static disengagement function of an automatic transmission of a motor vehicle comprises a hydrodynamical starting element. The hydrodynamical starting element of the automatic transmission can be made as a torque converter or as a Foettinger converter. In any case, the hydrodynamical starting element has a pump on the engine side and a turbine on the transmission side. The pump of the hydrodynamical starting element is coupled to the motor vehicle's engine and the turbine of the hydrodynamical starting element is coupled to an input shaft or drive shaft of the transmission.

In a first Block 1 of the method according to the invention, it is checked whether a gear engagement function of the automatic transmission is actuated. The gear engagement function can be actuated if, for example, a driver moves a selector lever of the automatic transmission from the parking position P or the neutral position N to the drive position D. If the gear engagement function of the automatic transmission is not active, but the automatic transmission is in the drive position D, for example, by virtue of the position of the selector lever, then starting from Block 1, the system branches to the left strand of the signal flowchart of FIG. 1 and thus to Block 2.

If the drive position of the automatic transmission is engaged in this way and its gear engagement function is inactive, then in Block 2 of the method according to the invention, it is checked in connection with a static disengagement function, whether criteria are fulfilled on the basis of which the static disengagement should be implemented. In the context of the method according to the invention, it is accordingly checked at the same time in Block 2 whether, on the one hand, the motor vehicle's speed is lower than a limiting speed value and whether, on the other hand at the same time, a characteristic parameter of the turbine of the hydrodynamical starting element is below a limiting value for the turbine characteristic parameter. If at least these two criteria are fulfilled in combination, then the system branches to Block 3 and static disengagement is implemented. Otherwise, the criteria are checked continuously in the sense of a loop.

According to a first advantageous further development of the present invention, the turbine characteristic parameter checked in Block 2 is a turbine torque to detect whether the turbine torque of the hydrodynamical starting element is below a limiting turbine torque value. For this, the turbine torque of the hydrodynamical starting element can be measured directly by a torque sensor. Alternatively, the turbine torque can be calculated from a speed difference between a measured turbine speed and a measured pump speed of the hydrodynamical starting element and the hydrodynamic characteristic thereof. In this case, the static disengagement is implemented when the drive position is engaged if the motor vehicle's speed is below the limiting speed value and, in addition or at the same time, the turbine torque of the hydrodynamical starting element is lower than the limiting turbine torque value.

It should be mentioned that in Block 2, besides checking the motor vehicle's speed and the turbine torque of the hydrodynamical starting element, other function-initiating criteria can also be tested. In accordance with the present invention, static disengagement is then only implemented when the motor vehicle's speed is lower than the limiting speed value when, in addition, the turbine torque of the hydrodynamical starting element is below the limiting turbine torque value and when, furthermore, at least one additional function-initiating criterion is fulfilled. Additional function-initiating criteria that can be checked or compared with a corresponding limiting value are a transmission temperature and/or an engine temperature and/or an engine torque and/or a color pedal actuation and/or a brake pedal actuation and/or a brake pressure and/or a clutch speed difference and/or a motor vehicle inclination and/or a diagnosis function signal and/or a shift program strategy function signal. Alternatively to or in combination with these function-initiating criteria, the gear currently engaged (actual gear) and/or the gear to be engaged (target gear) and/or a brake light signal and/or a function signal of a so-termed hill-holder system can be checked as function-initiating criteria. These additional function-initiating criteria, however, are only checked optionally. The only checks necessarily carried out for implementation of the static disengagement, when the drive position is engaged, are whether the motor vehicle's speed is lower than the limiting speed value and whether, at the same time, the turbine characteristic parameter is lower than a limiting value thereof.

According to another advantageous development of the invention, the turbine characteristic checked in Block 2 is the turbine speed of the hydrodynamical starting element to see whether the turbine speed is lower than a limiting turbine speed value. In that case, static disengagement is implemented when the drive position is engaged, if the motor vehicle's speed is lower than the limiting speed value when, at the same time, the turbine speed of the hydrodynamical starting element is lower than the limiting turbine speed value and, in addition, the motor vehicle's engine speed is lower than a limiting engine speed value. Alternatively, in this case and when drive position is engaged, the static disengagement function can also be actuated when the motor vehicle's speed is lower than the limiting speed value and the turbine speed of the hydrodynamical starting element is lower than the limiting turbine speed value but, when the engine speed is higher than a limiting engine speed value, the static disengagement function is deactivated.

In the case when, besides the motor vehicle's speed, the turbine speed is checked as the turbine characteristic parameter, it is obviously possible to optionally check other function-initiating criteria in order to implement static disengagement in combination with the other criteria. The optional function-initiating criteria in question are those already mentioned in relation to the further development of the invention in which, besides the motor vehicle's speed, the turbine torque is checked as the turbine characteristic parameter.

In Block 3, when static disengagement is implemented, this can be done either by shifting the automatic transmission from the drive position to a neutral or parking position or, alternatively, by bringing at least one clutch involved in the force flow into slipping operation. The slipping operation of one or more clutches involved in the force flow has the advantage that after the termination or deactivation of static disengagement, the reaction time to a driver's wish to start off can be shorter since the time otherwise needed for clutch filling is omitted.

In the context of the present invention, it is expedient to block static disengagement for a certain blocking time after deactivation of the static disengagement or emergence therefrom (Block 6), so that static disengagement cannot be reinstated or reactivated within that blocking time. Static disengagement can only be implemented again after the blocking time. This blocking of static disengagement (Block 7) can be effected either by specifying and therefore always constant blocking time or, on the other hand, the prevention or blocking of static disengagement can be made to depend on a speed of the motor vehicle or a distance covered. For example, it can be provided that static disengagement is blocked until the motor vehicle's speed has increased above a limiting speed value or until a given distance has been covered.

If it is found, in Block 1 of the method according to the invention, that the gear engagement function of the automatic transmission is active, the system branches to the right branch of the signal flow chart of FIG. 1 and, therefore, to Block 4. According to Block 4, gear engagement of the automatic transmission, for example, the shift of the automatic transmission from neutral or parking position to the drive position, is effected by filling at least one clutch of the automatic transmission. In a Block 5, it is continuously checked whether a characteristic parameter of the turbine of the hydrodynamical starting element is above a limiting gear engagement value and, when this limiting gear engagement value has been exceeded, the system branches from Block 5 to Block 3. In contrast, if the limiting gear engagement value of the turbine characteristic has not been exceeded, the system branches back to Block 4 and filling of the clutch or clutches continues.

As the turbine characteristic in Block 5 the turbine torque of the hydrodynamical starting element is preferably checked. If the turbine torque of the hydrodynamical starting element is found in Block 5 to be above the limiting gear engagement value then, as already mentioned, the system branches to Block 3 and otherwise to Block 4. In Block 5, besides checking whether the turbine torque is above the limiting gear engagement value at least one other function-initiating criterion is checked. This can be, for example, an accelerator pedal actuation and/or a brake pedal actuation. Function-initiating criteria, such as those already mentioned in connection with Block 2, can again be interrogated or checked.

REFERENCE NUMERALS

1 Block
2 Block
3 Block
4 Block
5 Block

The invention claimed is:

1. A method of controlling disengagement of a drive coupling between an automatic transmission and an engine of a motor vehicle, the method comprising the steps of:
   disengaging the drive coupling to the automatic transmission when both a speed of the motor vehicle is lower than a limiting speed value and when a parameter of a turbine characteristic of a torque converter is below a limiting value for the parameter of the turbine characteristic;
   re-engaging the drive coupling; and
   preventing, after re-engagement, disengagement of the drive coupling until at least one of a given blocking time has elapsed, the vehicle has travelled a given distance and the speed of the motor vehicle is higher than the limiting speed value.

2. The method according to claim 1, further comprising the step of defining the parameter of the turbine characteristic as a turbine torque of the torque converter and determining if the turbine torque of the torque converter is below a limiting turbine torque value.

3. The method according to claim 2, further comprising the step of measuring the turbine torque of the hydrodynamical starting element.

4. The method according to claim 2, further comprising the step of calculating the turbine torque of the torque converter from a speed difference between a measured turbine speed and a measured pump speed of the torque converter.

5. The method according to claim 1, further comprising the step of implementing the disengagement of the drive coupling when a drive position is engaged, if the speed of the motor vehicle is lower than the limiting speed value and a turbine torque of the torque converter is below a limiting turbine torque value.

6. The method according to claim 5, further comprising the step of implementing the disengagement of the drive coupling when the drive position is engaged, and at least one disengagement-initiating criterion is fulfilled.

7. The method according to claim 6, further comprising the step of, using one or more of a transmission temperature, an engine temperature, an engine torque, an accelerator pedal actuation, a clutch speed difference, a brake pressure, a brake pedal actuation, a motor vehicle inclination, a diagnosis function signal, and a shift program strategy function signal as the at least one disengagement-initiating criterion.

8. The method according to claim 6, further comprising the step of checking, as a further disengagement-initiating criterion, whether a turbine speed of the torque converter, is below a limiting turbine speed value.

9. The method according to claim 8, further comprising the step of implementing the disengagement of the drive coupling between the automatic transmission and the engine when the drive position is engaged, if the speed of the motor vehicle is lower than the limiting speed value, the turbine speed of the of the torque converter is lower than the limiting turbine speed value, and an engine speed is lower than a limiting engine speed value.

10. The method according to claim 8, further comprising the step of implementing the disengagement of the drive coupling between the automatic transmission and the engine when a drive position is engaged, if the motor vehicle's speed is lower than the limiting speed value and if, in addition, a turbine speed of the hydrodynamical starting element is lower than a limiting turbine speed value, and if an engine speed is higher than a limiting engine speed value, the static disengagement function is then deactivated.

11. The method according to claim 9, further comprising the step of implementing the disengagement of the drive coupling between the automatic transmission and the engine when, in addition, at least one further function-initiating criterion is fulfilled.

12. An automatic transmission for a motor vehicle, the transmission comprising:
   a drive coupling arranged between an automatic transmission and an engine of the motor vehicle;
   a control unit for controlling engagement and disengagement of the drive coupling, the control unit disengages the drive coupling when both a speed of the motor vehicle is lower than a limiting speed value and when a parameter of a turbine characteristic of a torque converter is below a limiting value for the parameter of the turbine characteristic;
   subsequently re-engaging the drive coupling; and
   preventing disengagement, after re-engagement, of the drive coupling until at least one of a given blocking time has passed, the speed of the motor vehicle has increased above the limiting speed value and the vehicle has travelled a given distance.

13. The automatic transmission according to claim 12, wherein the control unit further disengages drive coupling between the automatic transmission and the drive engine when a turbine torque of the torque converter is below a limiting turbine torque value.

14. The automatic transmission according to claim 12, wherein the control unit disengages the drive coupling between the automatic transmission and the drive engine when a drive position is engaged, if the speed of the motor vehicle is lower than the limiting speed value and a turbine torque of the torque converter is below a limiting turbine torque value.

15. The automatic transmission according to claim 14, wherein the drive position is engaged if, at least one drive coupling disengagement-initiating criterion is fulfilled.

16. The automatic transmission according to claim 15, wherein the at least one drive coupling disengagement-initiating criterion is one or more of a transmission temperature, an engine temperature, an engine torque, an accelerator pedal actuation, a clutch speed difference, a brake pressure, a brake pedal actuation, a motor vehicle inclination, a diagnosis function signal, and a shift program strategy function signal.

17. The automatic transmission according to claim 15, the at least one drive coupling disengagement-initiating criterion is fulfilled when a turbine speed of the torque converter is below a limiting turbine speed value.

18. A method of controlling disengagement of a drive coupling between an automatic transmission and an engine of a motor vehicle, the method comprising the steps of:
  measuring a turbine torque of a torque converter;
  comparing the turbine torque of the torque converter with a limiting turbine torque value;
  disengaging the drive coupling when both, a speed of the motor vehicle is lower than a limiting speed value and when the turbine torque of the torque converter is less than the limiting turbine torque value;
  re-engaging the drive coupling; and
  preventing disengagement, after re-engagement, of the drive coupling until at least one of a given blocking time has elapsed, the vehicle has travelled a given distance and the speed of the motor vehicle is higher than the limiting speed value.

19. A method of controlling disengagement of a drive coupling between an automatic transmission and an engine of a motor vehicle the method comprising the steps of:
  calculating a turbine torque of a torque converter from a difference between a measured speed of a turbine of the torque converter and a measured speed of a pump of the torque converter;
  comparing the turbine torque of the torque converter with a limiting turbine torque value;
  disengaging the drive coupling when both, a speed of the motor vehicle is lower than a limiting speed value and when the turbine torque of the torque converter is less than the limiting turbine torque value;
  re-engaging the drive coupling; and
  preventing disengagement, after re-engagement, of the drive coupling until a given blocking time has elapsed, the vehicle has travelled a given distance and the speed of the motor vehicle is higher than the limiting speed value.

* * * * *